United States Patent
Choi et al.

(10) Patent No.: US 9,148,340 B2
(45) Date of Patent: Sep. 29, 2015

(54) APPARATUS AND METHOD FOR NETWORK CONTROLLING IN WIRELESS COMMUNICATION SYSTEM

(75) Inventors: Ji-Hyeon Choi, Suwon-si (KR);
Sun-Wook Kim, Seoul (KR);
Seong-Yong Park, Seongnam-si (KR);
Jun-Sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 13/990,231

(22) PCT Filed: Nov. 30, 2011

(86) PCT No.: PCT/KR2011/009213
§ 371 (c)(1),
(2), (4) Date: May 29, 2013

(87) PCT Pub. No.: WO2012/074290
PCT Pub. Date: Jun. 7, 2012

(65) Prior Publication Data
US 2013/0250814 A1    Sep. 26, 2013

(30) Foreign Application Priority Data

Nov. 30, 2010 (KR) .......... 10-2010-0120475

(51) Int. Cl.
H04L 12/28 (2006.01)
H04L 12/26 (2006.01)
G06F 15/173 (2006.01)
H04L 12/24 (2006.01)
H04L 1/16 (2006.01)
H04W 40/08 (2009.01)

(52) U.S. Cl.
CPC .......... H04L 41/0803 (2013.01); H04L 1/1692 (2013.01); H04W 40/08 (2013.01)

(58) Field of Classification Search
CPC ..... H04W 52/46; H04W 52/10; H04W 52/16; H04W 52/18; H04W 52/08; H04W 40/246; H04W 40/02; H04W 40/08; H04W 84/18; H04W 8/005; H04W 72/0473; H04W 24/00; H04W 28/26; H04W 72/02; H04W 72/04; H04L 45/02; H04L 45/26
USPC .......... 370/238, 255; 709/244, 223, 238, 240, 709/242, 243

See application file for complete search history.

(56) References Cited

U.S. PATENT DOCUMENTS

| 6,810,428 B1 | 10/2004 | Larsen et al. |
| 2001/0033556 A1* | 10/2001 | Krishnamurthy et al. .... 370/329 |
| 2002/0044533 A1* | 4/2002 | Bahl et al. ...................... 370/255 |
| 2007/0195746 A1* | 8/2007 | Ryu et al. ...................... 370/338 |

FOREIGN PATENT DOCUMENTS

| KR | 10-2006-0098212 A | 9/2006 |
| KR | 10-2007-0023011 A | 2/2007 |

OTHER PUBLICATIONS

R. Montemanni, L. M. Gambardella, Power-Aware distributed protocol for a connectivity problem in wireless sensor networks, Self-star Properties in Complex Information Systems: conceptual and Practical Foundations, Springer-Verlag, Berlin, Heidelberg, 2005.*

* cited by examiner

*Primary Examiner* — Alpus H Hsu
*Assistant Examiner* — Elton Williams
(74) *Attorney, Agent, or Firm* — Jefferson IP Law, LLP

(57) ABSTRACT

An apparatus and a method for configuring a network in a terminal of a wireless communication system are provided. The network configuring method includes sending a reference message in a communication radius of the terminal; when receiving at least one ACKnowledge (ACK) message for the reference message, checking a node degree of each adjacent terminal which sends the ACK message, the node degree indicating the number of neighboring terminals of each adjacent terminal; forming an inner region and an outer region of the terminal based on an adjacent terminal of the greatest node degree among the adjacent terminals; determining a transmit power in the inner region and a transmit power in the outer region; and determining a final transmit power for configuring a network using the transmit power of the inner region and the transmit power of the outer region.

18 Claims, 5 Drawing Sheets

Prior Art

APPARATUS AND METHOD FOR NETWORK CONTROLLING IN WIRELESS COMMUNICATION SYSTEM

TECHNICAL FIELD

The present invention relates generally to an apparatus and a method for configuring a network in a wireless communication system. More particularly, the present invention relates to an apparatus and a method for configuring a low-power network between terminals using density of the terminal in a wireless communication system.

BACKGROUND ART

In recent, as performance of mobile communication terminals enhances, techniques for improving communication efficiency by building a communication network between terminals without using a separate relay station are drawing more attention. For example, the communication network between the terminals includes a sensor network or an ad-hoc network. At this time, the terminals can configure the network using Cone-Based Topology Control (CBTC) using location information of the corresponding terminal as shown in FIG. 1.

FIG. 1 depicts network configuration in a wireless communication system according to the related art.

When the network is configured based on $\pi/2$ as shown in FIG. 1, a terminal u 100 builds the network by selecting at least one adjacent terminal at an interval of $\pi/2$.

When the network is configured as stated above, the terminal maintains connection with at least one adjacent terminal in every region defined by a reference value. In this case, the terminal unnecessarily consumes power while maintaining the connection with many adjacent terminals in an environment of the dense terminals.

In addition, when there is no connectable adjacent terminal in any one of the regions defined by the reference value, the terminal communicates with the maximum power. Hence, the terminal communicates with the maximum power even in the region including the adjacent terminal connected, and thus unnecessarily consumes the power.

Since the terminal needs to keep the connection with at least one adjacent terminal in each region, computation and power consumption increase according to network re-configuration for the continuous service.

DISCLOSURE OF INVENTION

Solution to Problem

To address the above-discussed deficiencies of the prior art, it is a primary aspect of the present invention to provide an apparatus and a method for configuring a network between terminals in a wireless communication system.

Another aspect of the present invention is to provide an apparatus and a method for reducing power consumption according to network configuration between terminals in a wireless communication system.

Yet another aspect of the present invention is to provide an apparatus and a method of a terminal for reducing power consumption according to network configuration between terminals by minimizing unnecessary connection with an adjacent terminal in a wireless communication system.

Still another aspect of the present invention is to provide an apparatus and a method for configuring a network between terminals by considering a distribution probability of terminals in a wireless communication system.

A further aspect of the present invention is to provide an apparatus and a method for configuring a network between terminals by separating an inner region and an outer region according to directivity of a terminal in a wireless communication system.

According to one aspect of the present invention, a method for configuring a network in a terminal of a wireless communication system includes sending a reference message in a communication radius of the terminal; when receiving at least one ACKnowledge ACK) message for the reference message, checking a node degree of each adjacent terminal which sends the ACK message, the node degree indicating the number of neighboring terminals of each adjacent terminal; forming an inner region and an outer region of the terminal based on an adjacent terminal of the greatest node degree among the adjacent terminals; determining a transmit power in the inner region and a transmit power in the outer region; and determining a final transmit power for configuring a network using the transmit power of the inner region and the transmit power of the outer region.

According to another aspect of the present invention, an apparatus for configuring a network in a terminal of a wireless communication system includes an antenna; a communication unit for processing signals transmitted and received over the antenna; a control unit for controlling to send a reference message in a communication radius of the terminal; and a network configuration unit for, when receiving at least one ACK message for the reference message, forming an inner region and an outer region of the terminal based on an adjacent terminal of the greatest node degree among adjacent terminals which send the ACK message, and determining a final transmit power for configuring a network using a transmit power of the inner region and a transmit power of the outer region, and the node degree indicates the number of neighboring terminals of each adjacent terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for reducing power consumption according to network configuration between terminals in a wireless communication system.

Hereinafter, it is assumed that the network is configured using border effect which is stochastic property found in terminals which randomly move in a unit region. Herein, when the terminals randomly move in the unit region, the border effect indicates stochastic property of higher distribution of the terminals in the center part of the unit region than the border.

Figure 1:
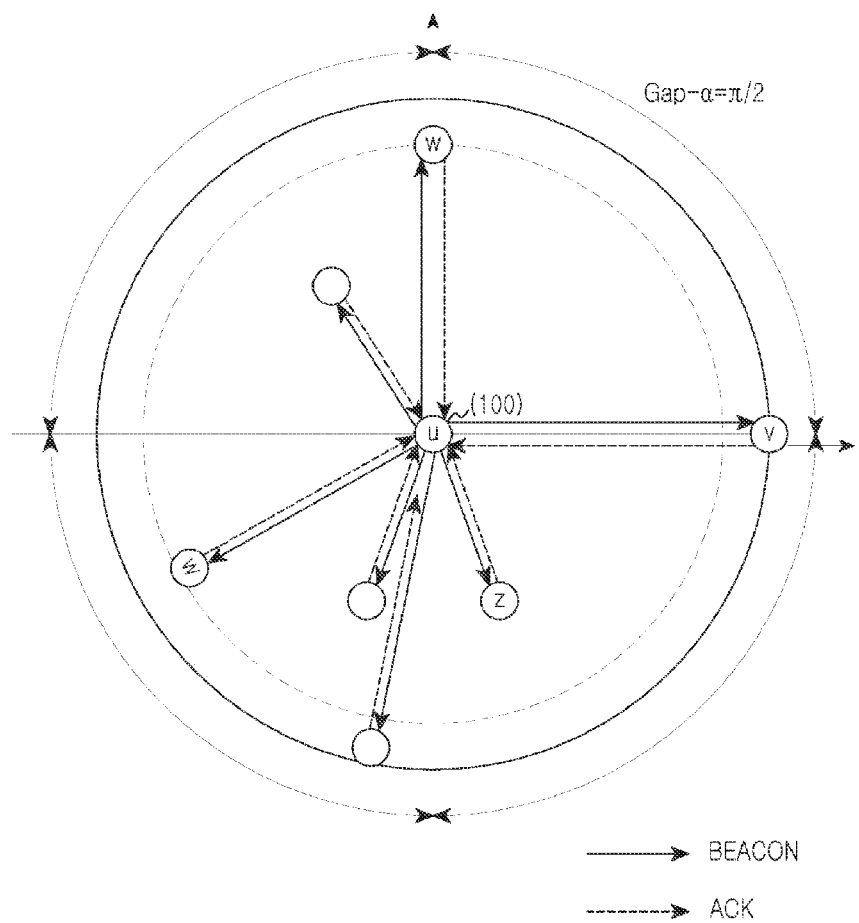
FIG. 1 is a diagram of network configuration in a wireless communication system according to the related art.
Figure 2:
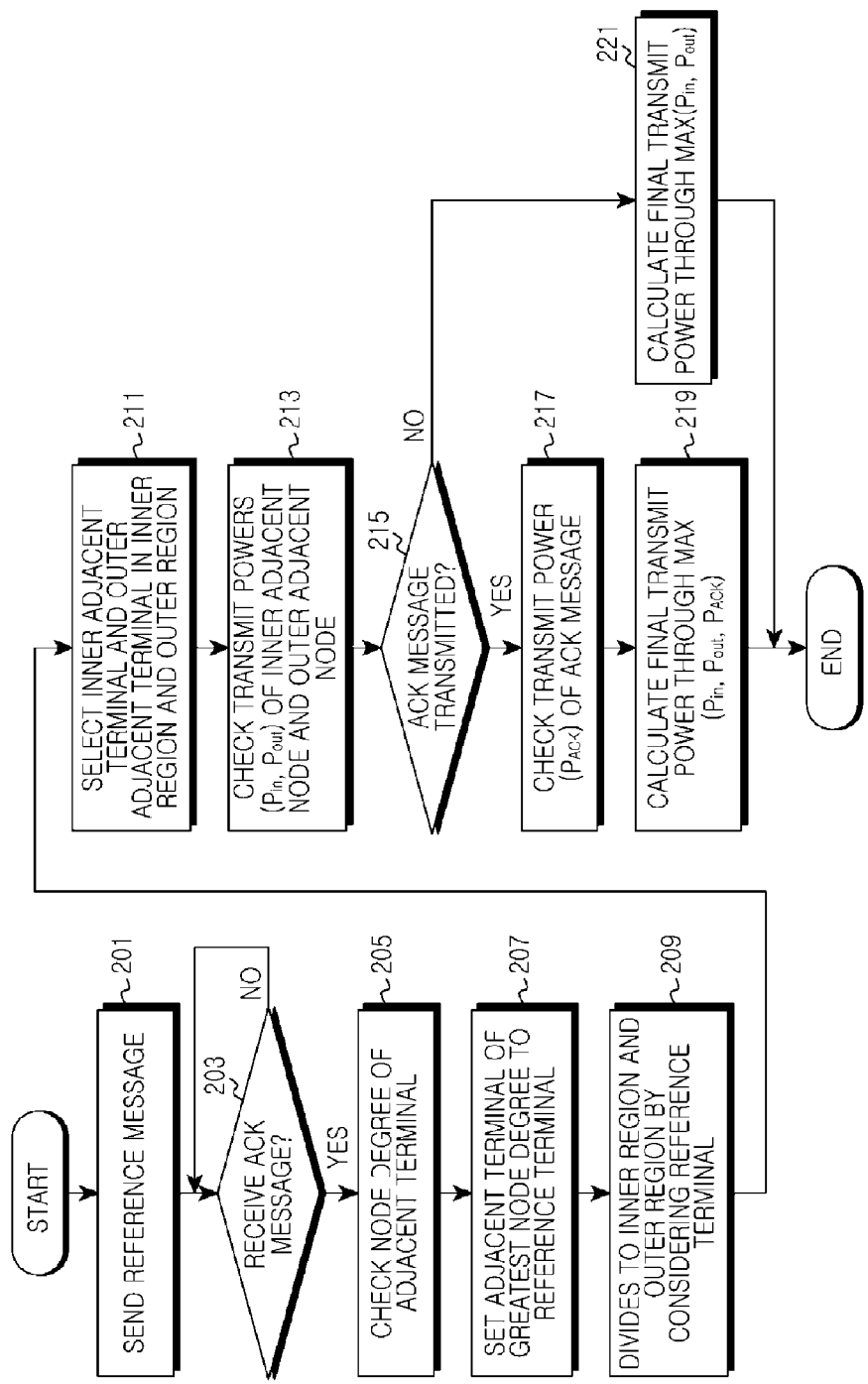
FIG. 2 is a diagram of a method for configuring a network in a terminal according to an exemplary embodiment of the present invention.

FIG. 2 illustrates a method for configuring a network in a terminal according to an exemplary embodiment of the present invention.

Referring to FIG. 2, the terminal sends a reference message to at least one adjacent terminal in step 201. For example, the terminal sends a beacon message to at least one adjacent terminal belonging to its communication radius. In so doing, the terminal sends the beacon message with a maximum transmit power.

Next, the terminal determines whether an ACKnowledge (ACK) message is received for the transmitted reference message in step 203. For example, the terminal determines whether ACK messages are received from all of adjacent terminals receiving the reference message. After the reference message is sent, when the ACK messages are not received from the adjacent terminals within a certain time, the terminal may resend the reference message in step 201.

When receiving the ACK message for the reference message, the terminal checks a node degree of each adjacent terminal in the ACK message in step 205. Herein, the ACK message includes identification information of the terminal sending the ACK message, identification information of the recipient terminal for receiving the ACK message, the transmit power, and the node degree. The node degree indicates the number of the terminals adjacent to the corresponding terminal.

Figure 3:
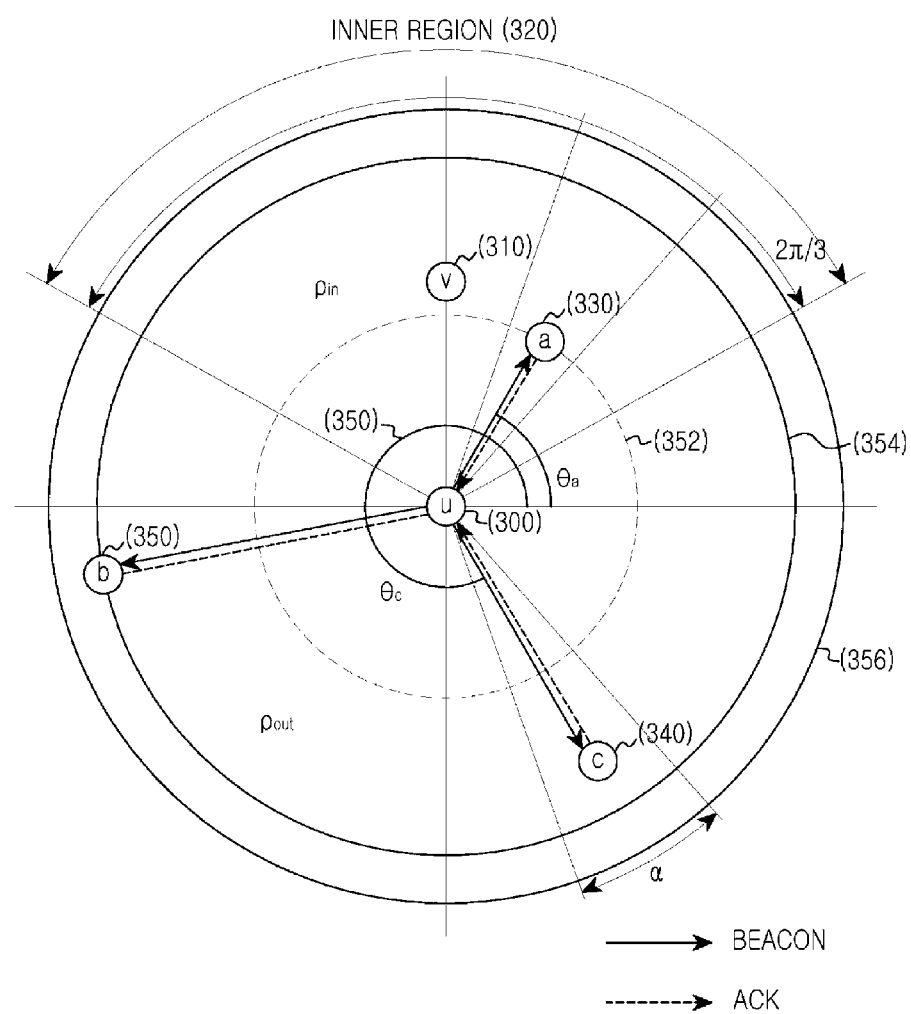
FIG. 3 is a diagram of network configuration according to an exemplary embodiment of the present invention.

After checking the node degree of the adjacent terminal, the terminal sets the adjacent terminal of the highest node degree to a reference terminal in step 207. For example, when the node degree of a terminal v 310 is highest among adjacent terminals of a terminal u 300 in FIG. 3, the terminal u 300 sets the terminal v 310 to the reference terminal.

After setting the reference terminal, the terminal divides the communication region to an inner region and an outer region based on the reference terminal in step 209. That is, the terminal recognizes that the adjacent terminal of the high node degree is located at the center of the unit region according to the border effect properties. Hence, the terminal forms the inner region and the outer region based on the adjacent terminal of the high node degree. For example, when the terminal u 300 selects the terminal v 310 as the reference terminal in FIG. 3, the terminal u 300 sets $2\pi/3$ region to the inner region 320 based on the terminal v 310 and sets the other region to the outer region. Herein, the terminal can form the inner region and the outer region using Angle of Arrival (AoA) technique.

Next, the terminal selects an inner adjacent terminal and an outer adjacent terminal while gradually increasing the transmit power in step 211. In so doing, the terminal sends the beacon message while gradually increasing the transmit power until the ACK message for the beacon message is received in the inner region and the outer region. For example, in FIG. 3, the terminal u 300 sends the beacon message with an initial transmit power 350. When receiving no ACK message for the beacon message in at least one of the inner region and the outer region, the terminal u 300 sends the beacon message with the transmit power 352 increased by one level. When receiving the ACK message from a terminal a 330 of the inner region, the terminal u 300 recognizes the terminal a 330 as the inner adjacent terminal according to the received ACK message. When not receiving the ACK message for the beacon message in the outer region, the terminal u 300 sends the beacon message with the transmit power 354 increased by one level. When receiving the ACK message from a terminal c 340 of the outer region, the terminal u 300 recognizes the terminal c 340 as the outer adjacent terminal according to the received ACK message.

As stated above, the terminal u 300 sends the beacon message while gradually increasing the transmit power until the inner adjacent terminal and the outer adjacent terminal are recognized. When not receiving the ACK message for the beacon message until the maximum transmit power 356 of the terminal u 300, the terminal u 300 recognizes the absence of the adjacent terminal. Herein, the inner adjacent terminal represents the terminal closest to the terminal u 300 in the inner region, and the outer adjacent terminal represents the terminal closest to the terminal u 300 in the outer region.

After selecting the inner adjacent terminal and the outer adjacent terminal in step 211, the terminal checks a power $p_{in}$ for communicating with the inner adjacent terminal and a power $p_{out}$ for communicating with the outer adjacent terminal in step 213. For example, the terminal recognizes the transmit power of the beacon message for the ACK message received from the inner adjacent terminal, as the power for communicating with the inner adjacent terminal. Also, the terminal recognizes the transmit power of the beacon message for the ACK message received from the outer adjacent terminal, as the power for communicating with the outer adjacent terminal.

Next, the terminal determines whether an ACK message is transmitted for a reference message received from the adjacent terminal in step 215.

When sending the ACK message, the terminal checks the transmit power $p_{ACK}$ required to send the ACK message in step 217.

In step 219, the terminal determines the maximum transmit power of $p_{in}$, $p_{out}$, and $p_{ACK}$ as a final transmit power to be used for the network configuration. That is, the terminal can configure the network with the inner adjacent terminal, the outer adjacent terminal, and the terminal sending the reference message by communicating with the determined final transmit power.

Meanwhile, when not sending the ACK message, the terminal selects the maximum transmit power of $p_{in}$ and $p_{out}$ as the final transmit power to be used for the network configuration in step 221. That is, the terminal can configure the network with the inner adjacent terminal and the outer adjacent terminal by communicating with the determined final transmit power.

Next, the terminal finishes this algorithm.

In the above-mentioned embodiment, the terminal configures the network using the inner region and the outer region formed based on the border effect. At this time, the terminal reconfigures the network according to the movement of the terminal by periodically updating the node degree of the adjacent terminal.

Figure 4:
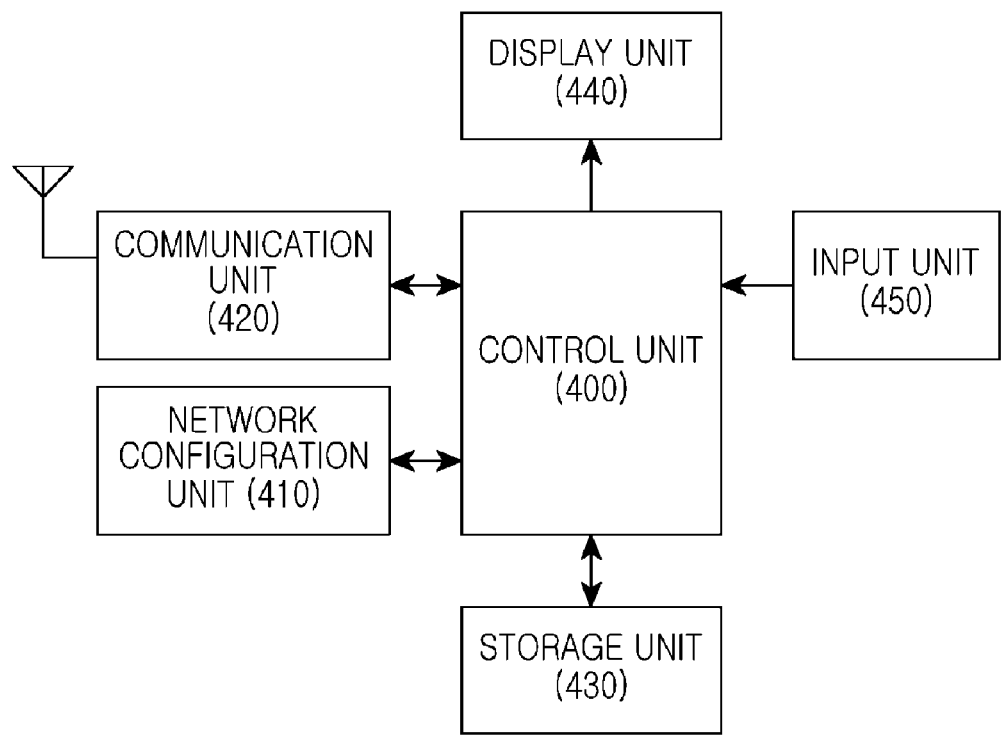
FIG. 4 is a block diagram of the terminal for configuring the network according to an exemplary embodiment of the present invention.

FIG. 4 is a block diagram of the terminal for configuring the network according to an exemplary embodiment of the present invention.

As shown in FIG. 4, the terminal includes a control unitunit 400, a network configuration unitunit 410, a communication unit 420, a storage unitunit 430, a display unitunit 440, and an input unitunit 450.

The control unitunit 400 controls overall operation of the terminal. For example, the control unitunit 400 controls to send the reference message based on the communication radius for distinguishing the inner region and the outer region. For example, when receiving the reference message from the adjacent terminal, the control unitunit 400 controls to send the ACK message for the reference message to the adjacent terminal which sends the reference message. In so doing, the control unitunit 400 controls to send the ACK message including the node degree of the terminal. Herein, the reference message includes the beacon message transmitted with the maximum transmit power. The network configuration unit 410 determines the final transmit power for configuring the network under control of the control unit 400. For example, the network configuration unit 410 confirms the node degree of the adjacent terminals in the ACK message according to the reference message transmitted within the communication radius under the control of the control unit 400 as shown in FIG. 2.

Next, the network configuration unit 410 forms the inner region and the outer region based on the adjacent terminal of the greatest node degree. Next, the network configuration unit 410 selects the inner adjacent terminal and the outer adjacent terminal by gradually increasing the transmit power. When the control unit 400 sends the ACK message for the reference message of the adjacent terminal, the network configuration unit 410 determines the maximum transmit power of the power $p_{in}$ for communicating with the inner adjacent terminal, $p_{out}$ for communicating with the outer adjacent terminal, and $p_{ACK}$ for sending the ACK message, as the final transmit power to be used for the network configuration. Meanwhile, when the control unit 400 does not send the ACK message for the reference message of the adjacent terminal, the network configuration unit 410 determines the maximum transmit power of the power $p_{in}$ for communicating with the inner adjacent terminal and $p_{out}$ for communicating with the outer adjacent terminal, as the final transmit power to be used for the network configuration.

The communication unit 420 processes signals transmitted and received over an antenna. For example, the communication unit 420 sends the reference message in the communication radius under the control of the control unit 400. For example, the communication unit 420 provides the reference message received from the adjacent terminal to the control unit 400. For example, the communication unit 420 sends the ACK message for the reference message provided from the adjacent terminal under the control of the control unit 400.

The storage unit 430 can include a program storage for storing a program to control the operations of the terminal, and a data storage for storing data generated in the program execution.

The display unit 440 displays state information, input character, moving picture, and still picture provided from the control unit 400.

The input unit 450 provides input data generated by a user's selection to the control unit 400.

In the above structure, the control unit 400 can function as the network configuration unit 410. They are separately provided to distinguish their functions. Accordingly, in the actual implementation, the control unit 400 can process all or unit of the functions.

In the above structure, the display unit 440 and the input unit 450 are separately provided. In the actual implementation, the display unit 440 and the input unit 450 may be formed as a single module.

Hereafter, the change of the power consumption is explained when the low-power network is configured.

Figure 5:
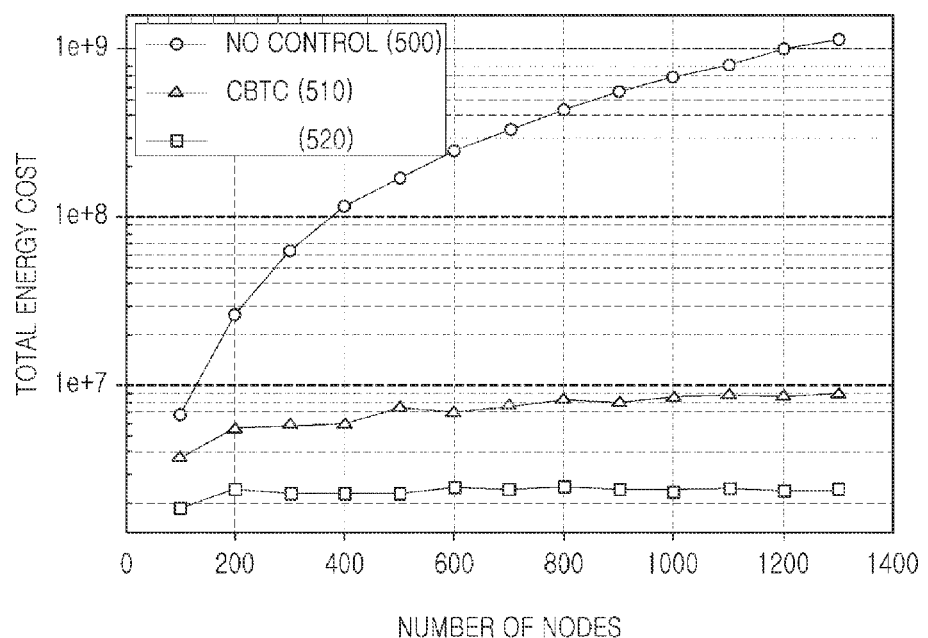
FIG. 5 is a graph of power consumption according to an exemplary embodiment of the present invention.

FIG. 5 is a graph of the power consumption according to an exemplary embodiment of the present invention.

FIG. 5 shows a first power consumption 500 of the network with no power control, a second power consumption 510 of the network configured according to Cone-Based Topology Control (CBTC), and a third power consumption 520 of the network configured according to the present invention.

As shown in FIG. 5, even when the number of the terminals in the network increases, the third power consumption 520 of the network configured according to the present invention exhibits the lower power consumption than the first power consumption 500 and the second power consumption 510.

As set forth above, as the wireless communication system configures the network between the terminals by minimizing the unnecessary connection with the adjacent terminal by considering the distribution probability of the terminals, the continuous time of the network configuration can be increased by reducing the unnecessary power consumption of the terminals and the low-power network appropriate for safety network establishment for emergency communication can be configured.

In addition, by configuring the low-power network between the terminals, overload of a base station according to the communication between the terminals and the base station can be reduced, a service area of the base station can be expanded, and data loss generated in weak-electric field data transmission can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for operation of a network in a terminal of a wireless communication system, the method comprising:
   sending a reference message in a communication radius of the terminal;
   when receiving at least one ACKnowledge (ACK) message for the reference message from at least one adjacent terminal, checking a node degree of each of the at least one adjacent terminal which sends the ACK message;
   forming an inner region and an outer region of the terminal based on a reference terminal, wherein the reference terminal is an adjacent terminal of the greatest node degree among the at least one adjacent terminal;
   determining a transmit power in the inner region and a transmit power in the outer region; and
   determining a final transmit power for configuring a network using the transmit power of the inner region and the transmit power of the outer region,
   wherein the node degree indicates the number of neighboring terminals of each of the at least one adjacent terminal.

2. The method of claim 1, wherein the checking of the node degree comprises:
   when receiving an ACK message for the reference message, checking the node degree of each adjacent terminal which sends the ACK message, in the ACK message.

3. The method of claim 1, wherein the determining of the transmit powers in the inner region and the outer region comprises:
   sending a control message;
   when receiving an ACK message from a certain adjacent terminal in the inner region, determining a transmit power for sending the control message, as the transmit power of the inner region;
   when receiving an ACK message from a certain adjacent terminal in the outer region, determining a transmit power for sending the control message, as the transmit power of the outer region; and
   when not receiving an ACK message for the control message from at least one of the inner region and the outer region, resending the control message by increasing the transmit power.

4. The method of claim 1, wherein the determining of the final transmit power comprises:
   determining the greatest transmit power of the transmit power in the inner region and the transmit power in the outer region, as the final transmit power.

5. The method of claim 1, further comprising:
   when receiving a reference message from an adjacent terminal, sending an ACK message for the reference message to the adjacent terminal.

6. The method of claim 5, wherein the determining of the final transmit power comprises:
   determining the greatest transmit power of the transmit power in the inner region, the transmit power in the outer region, and a transmit power of the ACK message sent to the adjacent terminal, as the final transmit power.

7. The method of claim 5, wherein the ACK message comprises at least one of an identifier of the terminal, an identifier of a terminal for receiving the ACK message, a transmit power, and a node degree.

8. The method of claim 1, wherein the reference message includes a beacon message.

9. The method of claim 1, wherein the forming of the inner region and the outer region comprises:
   based on a location of the adjacent terminal of the greatest node degree, setting a $2\pi/3$ region to the inner region and setting the other region to the outer region.

10. An apparatus for a terminal in a wireless communication system, the apparatus comprising:
    an antenna;
    a communication unit for processing signals transmitted and received over the antenna;
    a control unit for controlling to send a reference message in a communication radius of the terminal; and
    a network configuration unit for, when receiving at least one ACKnowledge (ACK) message for the reference message from at least one adjacent terminal, forming an inner region and an outer region of the terminal based on a reference terminal, the reference terminal being an adjacent terminal of the greatest node degree among the at least one adjacent terminals which send the ACK message, and determining a final transmit power for configuring a network using a transmit power of the inner region and a transmit power of the outer region,
    wherein the node degree indicates the number of neighboring terminals of each of the at least one adjacent terminal.

11. The apparatus of claim 10, wherein the reference message includes a beacon message.

12. The apparatus of claim 10, wherein, when receiving an ACK message for the reference message, the network configuration unit checks the node degree of each adjacent terminal which sends the ACK message, in the ACK message.

13. The apparatus of claim 10, wherein the forming of the inner region and the outer region comprises:
    based on a location of the adjacent terminal of the greatest node degree, setting, by the network configuration unit, a $2\pi/3$ region to the inner region and setting the other region to the outer region.

14. The apparatus of claim 10, wherein the network configuration unit sends a control message,
    when receiving an ACK message from a certain adjacent terminal in the inner region, determines a transmit power for sending the control message, as the transmit power of the inner region,
    when receiving an ACK message from a certain adjacent terminal in the outer region, determines a transmit power for sending the control message, as the transmit power of the outer region, and
    when not receiving an ACK message for the control message from at least one of the inner region and the outer region, resends the control message by increasing the transmit power.

15. The apparatus of claim 10, wherein the network configuration unit determines the greatest transmit power of the transmit power in the inner region and the transmit power in the outer region, as the final transmit power.

16. The apparatus of claim 10, wherein, when receiving a reference message from an adjacent terminal through the communication unit, the control unit controls to send an ACK message for the reference message to the adjacent terminal.

17. The apparatus of claim 16, wherein the network configuration unit determines the greatest transmit power of the transmit power in the inner region, the transmit power in the outer region, and a transmit power of the ACK message sent to the adjacent terminal, as the final transmit power.

18. The apparatus of claim 17, wherein the ACK message comprises at least one of an identifier of the terminal, an identifier of a terminal for receiving the ACK message, a transmit power, and a node degree.

\* \* \* \* \*